United States Patent Office 2,876,659
Patented Mar. 10, 1959

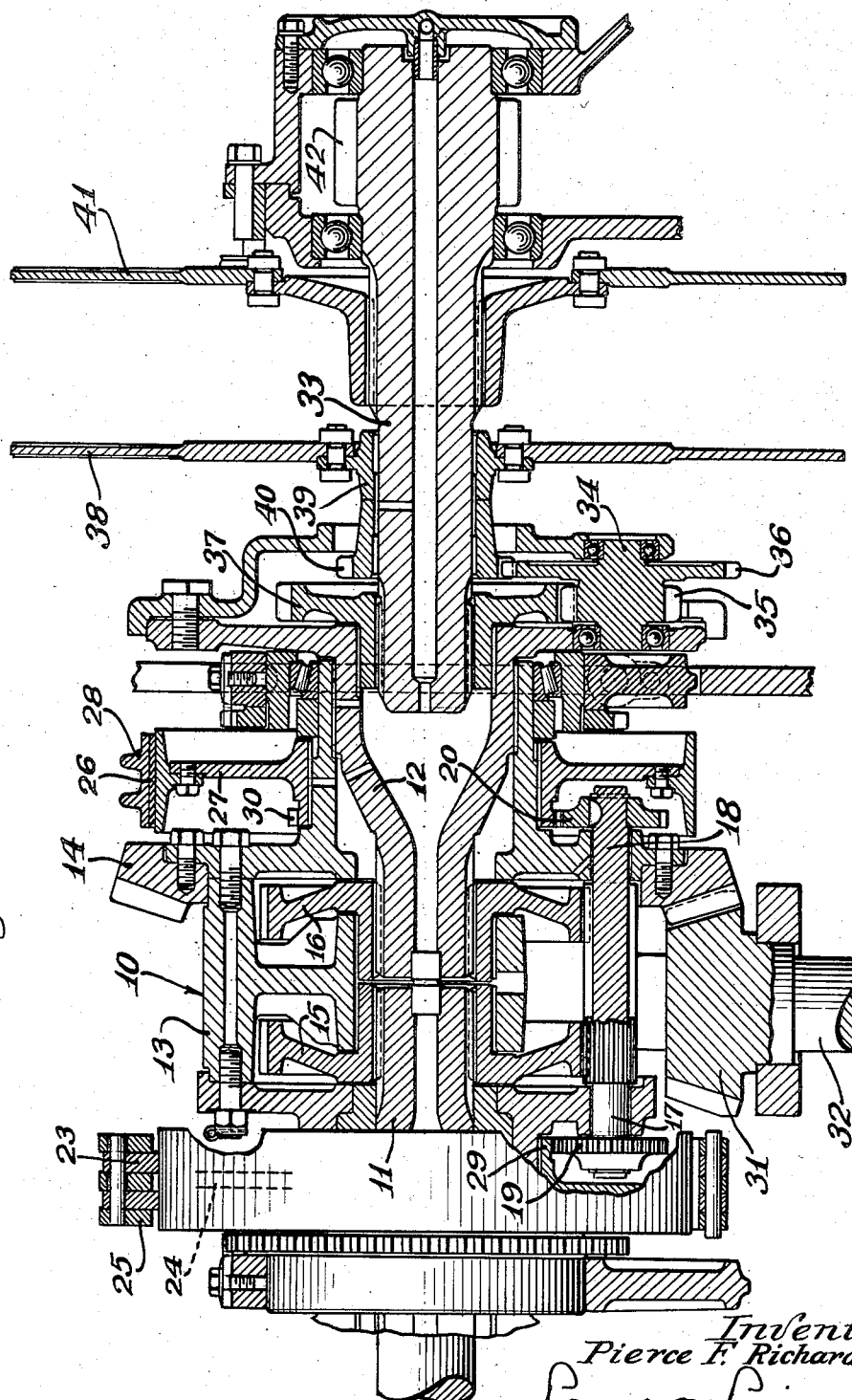

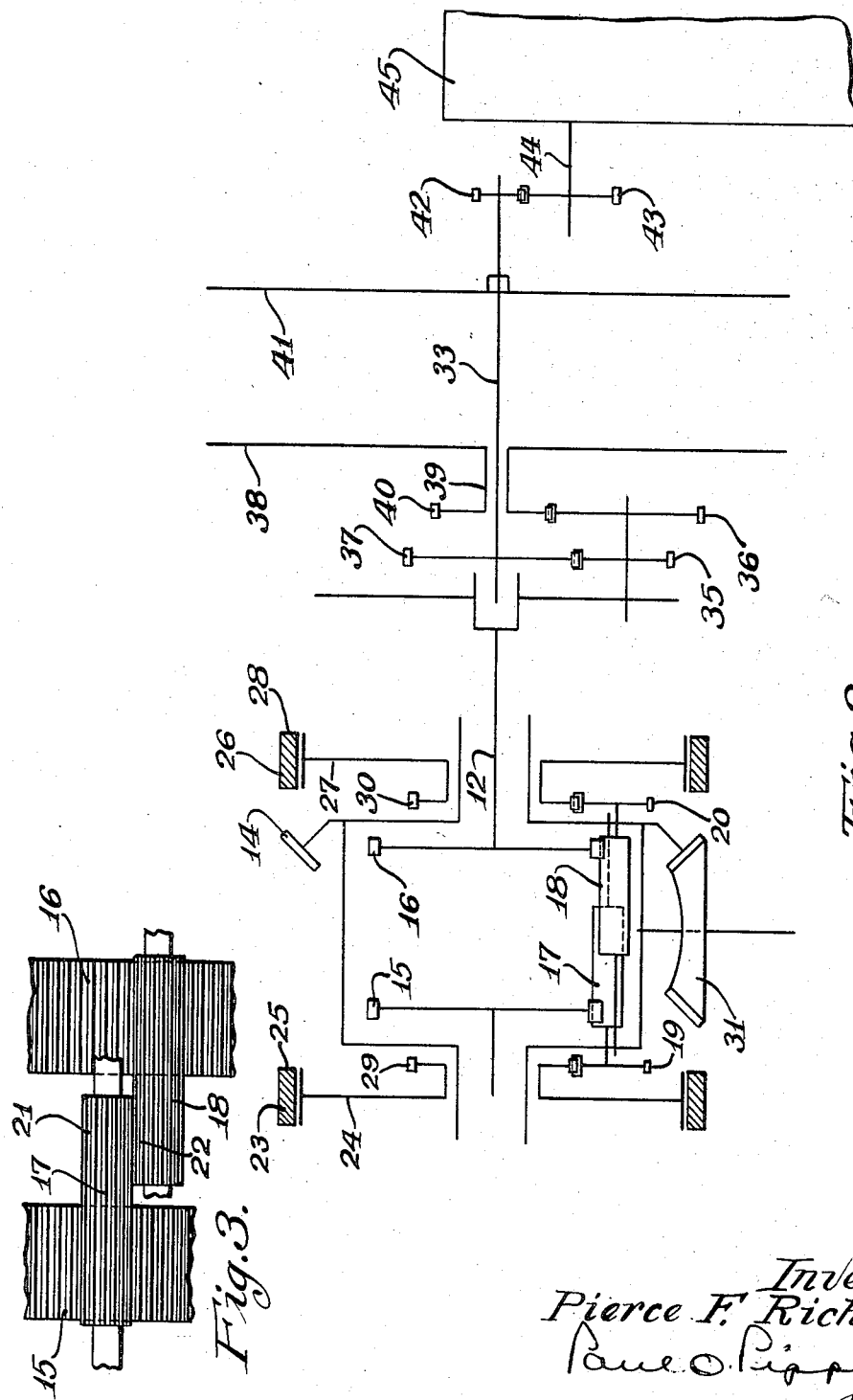

2,876,659
STEERING MEANS FOR VEHICLES

Pierce F. Richardson, Barrington, Ill., assignor to International Harvester Company, Chicago, Ill., a corporation of New Jersey Application March 8, 1957, Serial No. 644,798

5 Claims. (Cl. 74—710.5)

This invention relates to steering means for vehicles and is primarily concerned with a steering means for crawler tractors.

An object of the invention is to provide a steering means for vehicles so that both a gradual turn and a pivot turn can be made.

Another object of the invention is to provide a steering means for vehicles wherein when a gradual turn is made the vehicle will turn in the direction desired when on nonlevel ground.

The foregoing and other objects of the invention will be apparent from the construction and arrangement illustrated in the accompanying drawings wherein:

Figure 1 is a horizontal sectional view through a differential and pivot turn assisting means of a crawler tractor.

Figure 2 is a schematic horizontal sectional view through the differential and pivot turn assisting means and showing a fragment of one track of the tractor, and Figure 3 is a view of two gear carrying shafts in the differential.

In the past one manufacturer of crawler tractors made a crawler tractor which could make a definitely controlled gradual turn but could not make a pivot turn. Another manufacturer of crawler tractors made a crawler tractor which could make a pivot turn but could not make a definitely controlled gradual turn. In the crawler tractors used in the past which could make a pivot turn, turning was defective in this respect. Say, for example, that the operator of the tractor attempted a gradual turn to the left. If the tractor was on a side slope to the right the tractor would turn to the right. The opposite direction from the one desired. The tractor would also turn to the right when a left turn was attempted when going down a steep hill. In order to make a turn to the left and to keep the tractor from an unwanted turn to the right the tractor operator would have to manipulate several different controls at once and in the right relation. The invention proposes steering means for a crawler tractor whereby the tractor is able to make both a definitely controlled gradual turn and a pivot turn. The invention further proposes a steering means for crawler tractors wherein when a turn is made say to the left the turn will always be to the left whether the horizontal axis of the tractor is on a slope or whether the tractor is moving down a steep hill. Thus the tractor operator can make a satisfactory right or left pivot turn with little or no skill.

In the drawings, 10 generally designates a differential of a crawler tractor. The differential 10 is comprised of a pair of aligned hollow members 11 and 12 and a carrier 13 is rotatably mounted on the pair of bearings and a bevel gear 14 is fixedly secured on the carrier. The differential 10 is further comprised of a spur gear 15 fixedly secured on the hollow member 11 by being splined thereon and a spur gear 16 is fixedly secured on the hollow member 12 by being splined thereon and three pairs of shafts 17 and 18 are rotatably mounted in the carrier 13 and a spur gear 19 is fixedly secured on one end of the shaft 17 and a spur gear 20 is fixedly secured on the remote end of the shaft 18 and the shafts have gear teeth formed integral therewith and extending inwardly from their other ends defining spur gears 21 and 22 on shafts 17 and 18 respectively and the spur gears 21 and 22 mesh with each other and with spur gears 15 and 16 respectively. The differential 10 is further comprised of a brake 23 having a brake drum 24 rotatably mounted on the carrier 13 and engaging parts 25 and a brake 26 having a brake drum 27 rotatably mounted on the carrier 13 and engaging parts 28 and a spur gear 29 is fixedly secured on the brake drum 24 by being formed integral therewith and meshes with the spur gear 19 and a spur gear 30 is fixedly secured on the brake drum 27 by being formed integral therewith and meshes with the spur gear 20. The bevel gear 14 is rotated by a bevel pinion 31 fixedly secured on a shaft 32 which is connected to the transmission.

The pivot turn assisting means are disposed at the outer end of each of the hollow members 11 and 12. Since these means for each hollow member 11 or 12 are identical only the one at the outer end of hollow member 12 is shown in the drawings. The pivot turn assisting means is comprised of a member 33 arranged in aligned relation with hollow member 12 and having one end disposed in the hollow member. Three shafts 34 are rotatably mounted in the hollow member 12 and a spur gear 35 is formed integral with the shaft and a spur gear 36 is also formed integral with the shaft. A spur gear 37 is fixedly secured on member 33 by being splined thereon and meshes with the spur gear 35. A releasing and holding means 38 has a sleeve 39 secured thereto and the sleeve is rotatably mounted on the member 33 and a spur gear 40 is formed integral with the sleeve and meshes with the spur gear 36. A brake element 41 is fixedly secured to the member 33 by being splined thereon. The member 33 has a spur gear 42 formed integral therewith which meshes with a spur gear 43 fixedly secured on a shaft 44 which is fixedly secured to the rear sprocket of the respective track 45 of the crawler tractor.

The mode of operation of the entire mechanism when the tractor is proceeding in a straight forward direction is as follows: The brake drums 24 and 27 are released and rotation of shaft 32 causes bevel gear 14 to be rotated and brake drums 24 and 27 and spur gears 19 and 20 and spur gears 21 and 22 rotate spur gears 15 and 16 respectively causing rotation of the hollow members 11 and 12. Since from the hollow members to the track the operation is the same only the operation from hollow member 12 to track 45 will be described. The releasing and holding means 38 is held stationary. This is done by means which engages the means 38 and the first named means is actuated to engaging or disengaging position by a lever on the tractor. Rotation of the hollow member 12 causes spur gear 36 to move around spur gear 40 and spur gear 35 causes spur gear 37 to be rotated resulting in rotation of member 33. The brake element 41 is released. A lever on the tractor operates means to engage or disengage the brake element 41 so that the brake element is held against rotation or is allowed to rotate. Rotation of member 33 causes spur gear 42 to rotate spur gear 43 and shaft 44 and the rear sprocket to drive track 45 to move the tractor in a straight forward direction. To back up the direction of rotation of shaft 32 is reversed and the operation of the differential and the pivot turn assisting means is similar to their operation in a forward direction.

The operation of the entire mechanism when making a gradual turn toward the left is as follows: Engaging part 28 is applied slightly against brake drum 27 so that it slows down. When drum 27 slows down gear 30 which is secured to it slows down and gear 20 is forced to rotate along with shaft 18 and gear 22 in such a way that gear 16 slows down. At the same time gear 22 drives gear 21 which drives gear 15 but in such a way that gear 15 speeds up. The releasing and holding means 38 adjacent the hollow member 12 is held against rotation and the brake element 41 adjacent the hollow member 12 is released. Rotation of the hollow member 12 causes spur gear 36 to roll around spur gear 40 and spur gear 35 rotates spur gear 37 resulting in the rotation of member 33 and finally the rear sprocket of track 45. Thus slowing down gear 16 slows down left hand track 45 and speeding up gear 15 speeds up right hand track 45 causing right hand track to overrun left hand track and vehicle to turn to left. The operation of the entire mechanism when making a gradual turn toward the right is similar to the operation of the entire mechanism when making a gradual turn toward the left.

The operation of the entire mechanism when making a pivot turn to the left is as follows: The right hand engaging parts 23 are applied against brake drum 24 so that the brake drum stops. The left hand releasing and holding means 38 adjacent hollow member 12 is released and the left hand brake element 41 adjacent hollow member 12 is held against rotation and the left hand track stops. Right hand brake drum 24 is stopped so that gear 15 on right hand side is slowed down to minimum speed, right hand clutch element is engaged and right hand brake element 41 is released so right hand track turns and causes vehicle to pivot about stationary left hand track. The operation of the entire mechanism when making a pivot turn to the right is similar to the operation for making a pivot turn to the left.

The differential and gradual and pivot turn assisting means may also be used on tanks and four wheel rubber tired tractors.

What is claimed is:

1. Steering means comprising a differential comprising a pair of aligned hollow members and means for driving the pair of hollow members and means operatively connected to the pair of hollow members so that one of the hollow members may be speeded up and the other of the hollow members slowed down, and pivot turn assisting means at the outer end of each of the hollow members comprising a third member arranged in aligned relation with the respective hollow member and a first gear rotatably mounted in the respective hollow member and a second gear rotatably mounted on the respective hollow member and a third gear fixedly secured on the third member and meshing with the first gear and a releasing and holding means and a fourth gear fixedly secured on the releasing and holding means and meshing with the second gear and a brake element fixedly secured on the third member.

2. Steering means comprising a differential comprising a pair of aligned hollow members and a driving means rotatably mounted on the pair of hollow members and a first brake and means operatively connecting the first brake to the pair of hollow members so that when there is braking action on the first brake one of the hollow members speeds up and the other of the hollow members slows down, and pivot turn assisting means at the outer end of each of the hollow members comprising a shaft rotatably mounted on the respective hollow member and a first gear fixedly secured on the shaft and a second gear fixedly secured on the shaft and a third member having one end disposed in the respective hollow member and a third gear fixedly secured on the third member and meshing with the first gear and a releasing and holding means rotatably mounted on the third member and a fourth gear fixedly secured on the releasing and holding means and meshing with the second gear and a brake element fixedly secured on the third member.

3. Steering means for a crawler tractor comprising a differential comprising a pair of aligned hollow members and a carrier rotatably mounted on the pair of hollow members and a first gear fixedly secured on the carrier and a second gear fixedly secured on said one of the hollow members and a third gear fixedly secured on the other of the hollow members and a pair of shafts arranged in side by side relation and rotatably mounted on the carrier and a fourth gear fixedly secured on one end of one shaft and a fifth gear fixedly secured on the remote end of the other shaft and a sixth gear fixedly secured on the other end of said one shaft and a seventh gear fixedly secured on the other end of said other shaft and the sixth and seventh gears being arranged in meshing relation and a first brake rotatably mounted on the carrier and a second brake rotatably mounted on the carrier and an eighth gear fixedly secured on the first brake and meshing with the fourth gear and a ninth gear fixedly secured on the second brake and meshing with the fifth gear and pivot turn assisting means at the outer end of each of the hollow members comprising a third shaft rotatably mounted on the respective hollow member and a tenth gear fixedly secured on the third shaft and an eleventh gear fixedly secured on the third shaft and a third member having one end disposed in the respective hollow member and a twelfth gear fixedly secured on the third member and meshing with the tenth gear and a releasing and holding means rotatably mounted on the third member and a thirteenth gear fixedly secured on the releasing and holding means and meshing with the eleventh gear and a brake element fixedly secured on the third member.

4. In a change-speed driving and steering gear for steering-by-driving vehicles having ground-engaging propelling means at respective opposite sides thereof; a differential unit comprising a carrier rotatable about a principal axis, independently rotatable sun gears mounted coaxial with the carrier, and intermeshed planet gears journalled in the carrier and respectively meshed with the sun gears; selectively operable speed controlling units at opposite axial ends of the differential unit and each comprising a control planet gear which are respectively drivingly connected with and differing in diameter from the intermeshed planet gears and planetatable therewith, control sun gears respectively in the speed controlling units coaxial with the carrier and meshed with the control planet gears of their respective units, and means for selectively constraining the sun gears against rotation to cause cooperation of the constrained gear with its control planet gear and the intermeshed planet gears to drive the differential sun gears at different speed, disengageable driving means respectively connecting the differential sun gears with the ground-engaging propelling means; and brake means for each propelling means; each brake means being engageable independently of the other with selectively variable intensity during non-constrainment of the control sun gears and during engagement of the disengageable driving means to cause the differential unit to drive the ground-engaging propelling means at selectively variable relative speed, and each brake means also being engageable independently of the other with selectively variable intensity during disengagement of only the driving means for the propelling means being braked and during constraining of one of the control sun gears causing the differential to drive the non-braked propelling means.

5. The combination set forth in claim 4, wherein while either propelling means driving means is disengaged and the propelling means thus drivingly disengaged from the differential unit is braked against vehicular advance, the control sun gear constraining means is operable to selectively constrain such sun gears to cause the differential to drive the non-braked propelling means at respectively different speeds for effecting pivot turn of the vehicle with selected rapidity.

References Cited in the file of this patent

UNITED STATES PATENTS

| | | |
|---|---|---|
| 2,158,935 | Gustafson | May 16, 1939 |
| 2,486,815 | Banker | Nov. 1, 1949 |
| 2,496,429 | Baker et al. | Feb. 7, 1950 |

FOREIGN PATENTS

| | | |
|---|---|---|
| 611,161 | Great Britain | Oct. 26, 1948 |